US006793003B2

United States Patent
Triantopoulos et al.

(10) Patent No.: US 6,793,003 B2
(45) Date of Patent: Sep. 21, 2004

(54) EXOTHERMIC WELDING MOLD CONVERSION PLUG

(75) Inventors: George Triantopoulos, Collierville, TN (US); Jerry Woodward, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 104 days.

(21) Appl. No.: 10/351,290

(22) Filed: Jan. 24, 2003

(65) Prior Publication Data

US 2003/0178168 A1 Sep. 25, 2003

Related U.S. Application Data (60) Provisional application No. 60/367,958, filed on Mar. 25, 2002.

(51) Int. Cl.[7] .......................... B22D 19/04; B23K 23/00
(52) U.S. Cl. .......................... 164/349; 164/54; 249/86; 228/234.3
(58) Field of Search ...................... 164/54, 349; 249/86; 228/234.3

(56) References Cited

U.S. PATENT DOCUMENTS

| | | |
|---|---|---|
| 2,011,955 A | 8/1935 | Touceda |
| 2,957,214 A | 10/1960 | Kuharski |
| 3,020,608 A | 2/1962 | Gelfand |
| 3,113,359 A | 12/1963 | Burke |
| 3,234,603 A | 2/1966 | Leuthy et al. |
| 3,255,498 A | 6/1966 | Leuthy et al. |
| 3,782,677 A | 1/1974 | Gelfand |
| 3,971,117 A * | 7/1976 | Osterhout et al. .......... 249/174 |
| 5,062,903 A | 11/1991 | Bronan et al. |
| 5,145,106 A | 9/1992 | Moore et al. |
| 5,533,662 A | 7/1996 | Stidham et al. |
| 5,647,425 A | 7/1997 | Foutz et al. |
| 5,653,279 A | 8/1997 | Foutz et al. |
| 5,715,886 A | 2/1998 | Fuchs |
| 5,829,510 A | 11/1998 | Fuchs |
| 5,954,261 A | 9/1999 | Gaman |
| 6,316,125 B1 | 11/2001 | Gaman et al. |
| 6,640,873 B2 * | 11/2003 | Triantopoulos et al. ....... 164/54 |
| 2002/0124984 A1 * | 9/2002 | Soderstrom et al. .......... 164/53 |

FOREIGN PATENT DOCUMENTS

GB    2 065 528 A    7/1981

* cited by examiner

Primary Examiner—Kuang Y. Lin
(74) Attorney, Agent, or Firm—Hoffmann & Baron, LLP (57) ABSTRACT

A weld mold assembly which includes a crucible section for exothermically reacting weld material to form a molten metal, a weld mold having a weld chamber with an opening for receiving the molten metal and a plurality of guide holes for receiving ground rods and wires, and a cylindrical or tapered conversion plug sealably inserted into at least one of the guide holes to provide a weld assembly with a variety of different configurations.

19 Claims, 7 Drawing Sheets

EXOTHERMIC WELDING MOLD CONVERSION PLUG

This application claims priority from provisional application Serial No. 60/367,958, filed on Mar. 25, 2002.

FIELD OF THE INVENTION

The present invention relates generally to weld assemblies for forming conductor to conductor welded connections and more particularly to conversion plugs for weld molds which allow a single weld mold design to be used for multiple applications.

BACKGROUND OF THE INVENTION

Exothermic weld assemblies are used to connect two or more conductors, such as electrical wires to grounding rods or reinforcing rods and the like. Exothermic welds have long been recognized as providing an excellent electrical quality connection between two or more conductors. Exothermic welds provide low resistance, high ampacity and long-lasting, reliable grounding connections.

Conventional exothermic weld assemblies typically have a crucible in a top section in fluid communication with a mold section therebelow through a tap hole extending from the bottom of the crucible. The crucible includes a chamber for holding a quantity of exothermic material. The mold section includes a weld chamber and a plurality of guide holes connecting the weld chamber and the exterior of the mold. The ends of the conductors that are being welded together are inserted into the weld chamber through these guide holes. The weld molds (also referred to as welding molds) are made with various configurations based on the number and size of the conductors that are being connected. Two of the most commonly used configurations are the "wire to rod" and "wire to wire" designs. In the "wire to rod" design, the rod usually enters the weld chamber from the bottom and one or more wires enter the weld chambers through the side walls.

The crucible and mold may be designed as a single unit or two individual units and each unit may be disposable or reusable. The exothermic material in the crucible is ignited to produce a chemical reaction that is completed typically in seconds and produces a molten metal. The liquid metal flows from the crucible section into the weld chamber of the mold section where it envelops the ends of the conductors causing them to melt and thereby weld together.

The ends of the conductors to be welded are inserted into the weld chamber via guide holes, which allow the weld chamber to communicate with the outside of the weld assembly. Examples of such exothermic weld molds are disclosed in U.S. Pat. No. 3,020,608 to Gelfand and U.S. Pat. No. 5,715,886 to Fuchs, which are incorporated herein by reference. Typically, these guide holes are pre-formed in the mold in a variety of different configurations to accommodate the number of conductors which are being connected, as well as their size and orientation. Many weld mold designs can be modified for specific applications by drilling additional guide holes through the mold into the weld chamber.

Conventional weld molds are disposable, single use units that are generally cylindrically shaped structures with a curved outer surface. The weld molds are available with limited variations in the number and location of the guide holes. Some weld molds are constructed so that additional guide holes can be drilled depending upon the application and the number of conductors to be joined. However, one of the problems with conventional weld mold assemblies is that there is no convenient way to modify an assembly which has more guide holes than required for an application. Accordingly, to provide for the different applications that may arise, it is necessary to have many different weld mold assembly designs available with a variety of guide hole configurations. This requires a user to stock a large inventory of weld assemblies. Thus, conventional exothermic weld assemblies are less than satisfactory and there is a need for a weld mold assembly that can be configured for use in a variety of different applications.

Accordingly, it would be desirable to provide an exothermic weld assembly which can be easily adapted to a variety of different configurations without having to drill additional holes.

SUMMARY OF THE INVENTION

The present invention relates to a weld mold assembly which includes a crucible section for exothermically reacting weld material to form a molten metal; a weld mold including a weld chamber with an opening for receiving the molten metal and in communication with the crucible section; and a conversion plug sealably inserted into at least one of the guide holes. The guide holes have a weld chamber end and an exterior end and can receive ground rods and/or wires. The conversion plug can be cylindrical or tapered to provide a frustoconical shape. The weld mold also includes a plurality of guide holes extending from the weld chamber to the exterior of the weld. In one embodiment, the weld mold includes a guide hole for receiving a ground rod and a plurality of guide holes for receiving wires. The crucible section, which is used for exothermically reacting weld material to form a molten metal, is in communication with the opening in the weld chamber through a tap hole. In another embodiment of the present invention, the crucible section can be separated from the weld chamber so that the crucible section can be reused. A nozzle separably connects the crucible section and the weld chamber so that the tap hole is in communication with the opening in the mold chamber.

The weld mold is constructed from a refractory frangible material and can have a plurality of flat exterior surfaces. The conversion plug is fabricated from a ceramic, graphite or a refractory frangible material. The conversion plug is inserted into the guide hole from the weld chamber end or from the exterior end. A wire or sheet metal clip can be used to hold the conversion plug in place. The weld mold assembly can be designed so that the weld mold assembly is disposable or reusable.

In one embodiment, the conversion plug includes a ceramic or graphite cylindrical body having a first end and a second end, wherein the distance between the ends is greater than the diameter of the cylindrical body. In a preferred embodiment, the cylindrical body is tapered toward the second end. In another embodiment, the conversion plug includes a base connected to the cylindrical body at the first end.

DETAILED DESCRIPTION OF THE PREFERRED EMBODIMENT

The conversion plugs of the present invention allow a single weld mold assembly design to be used for a variety of different applications. Weld molds typically have a plurality of guide holes into which ground rods and wires that are to be connected by the weld are inserted. When all of the guide holes of a weld mold are not being used to make a connection, one or more conversion plugs can be inserted in the unused guide holes. This allows a user to quickly and easily change the configuration of an exothermic weld mold assembly without having to use any tools or drill any additional holes.

The present invention relates to weld mold assemblies which are used to weld together two or more ground rods and/or wires which are inserted into the weld chamber of the weld mold assembly through a plurality of guide holes. More particularly, the present invention relates to conversion plugs which are inserted into unused guide holes to seal the weld chamber and adapt a weld mold assembly for a specific application. The dimensions of the conversion plug can vary according to the size of the guide hole that is being sealed.

In one embodiment of the present invention, the conversion plug is provided with a base that conforms to the outer wall of the weld mold. In another embodiment, the conversion plug is cylindrical in shape. In a preferred embodiment, the conversion plug has a tapered, generally cylindrical shape which allows the conversion plug to be used to seal guide holes of different sizes.

In accordance with one embodiment of the present invention, there is provided an exothermic disposable weld mold assembly having a crucible section which includes a reaction chamber and a mold section which includes a weld chamber in communication with the reaction chamber. The mold section has a plurality of flat exterior surfaces, wherein at least three of such surfaces each have a hole extending therethrough in communication with the weld chamber. At least one conversion plug is sealably inserted in at least one of the holes in the weld body. In this assembly, both the crucible section and the mold section are designed as a single unit, permanently attached and disposed after use.

In accordance with another embodiment of the present invention, there is provided an exothermic weld mold assembly having a reusable crucible section including a reaction chamber. The crucible section has an open top for receiving an exothermic material in the reaction chamber. Also included is a disposable mold having a plurality of flat exterior surfaces, a top portion and a bottom portion. A weld chamber is located between the top and the bottom portions of the mold. The weld chamber has an opening to the top portion of the mold which is in communication with the reaction chamber. A hole extends through at least three of the flat exterior surfaces and communicates with the weld chamber and at least one conversion plug is sealably inserted in at least one of the holes. Additionally, a conductor is disposed in at least two holes with ends of the conductors projecting into the weld chamber. In this assembly, both the crucible section and the mold sections are designed as two individual units, temporarily attached, where the crucible section can be reused while the mold section is disposed after use.

The "conversion plug" of the present invention can be used as a stopper on most ceramic and graphite welding mold designs that are currently being used. In a preferred embodiment, the conversion plug quickly and conveniently converts the mold from a "wire to rod" connection to a "wire to wire" connection. In another embodiment, the number of guide holes for wire connections can be reduced by inserting one or more conversion plugs in the guide holes. For example, a weld mold assembly with guide holes for four wires can be converted to a two wire assembly by inserting conversion plugs in two of the guide holes. This also allows the user to select the orientation of the guide holes for the wires which are inserted into the weld mold assembly. The design of the plug allows the conversion to take place in the field by the installing technician according to the requirements of the specific application.

The welding molds which are now being used require different molds for "wire to wire" connections and "rod to wire" connections. Accordingly, a connection for a wire to ground rod requires a different mold than a wire to wire connection of the same wire size. The design of the welding molds currently being used requires two different welding molds for two different weld connection configurations. These welding molds are dedicated to one type of weld connection application, i.e., either "wire to rod" or "wire to wire" connections and the molds are not interchangeable. Therefore, a welding mold user has to purchase and stock two types of welding molds to have the capability to weld both "wire to wire" and "wire to rod" connections for the same range of wire sizes. In contrast, the conversion plugs of the present invention can be used with standard "wire to rod" molds now in use to expand the mold's capability so that they can also be used to make welds for "wire to wire" connections.

In one embodiment, the conversion plug is used to seal the guide hole in the weld mold intended for use with the ground rod. The plug is inserted into the guide hole intended for the ground rod either from the bottom of the mold or from the top, depending on whether the mold is constructed for top or bottom entry of the rod. When the guide hole for the ground rod is in the bottom of the weld mold, a wire or sheet metal retainer clip can be used to hold the plug in place during the welding process. The plug is a simple round stock piece with or without taper to fit the various molds (see FIGS. 6–10). In a preferred embodiment, the plug is sealably inserted into the guide hole from the interior of the weld mold, that is, from the weld chamber side of the guide hole. As a result, the mold is converted from a "rod to wire" connection mold to a "wire to wire" connection mold. This converted mold can be used to connect two or more wires.

The conversion plug overcomes many problems both at the end user side and the manufacturing side. The end user does not have to have a separate mold for an application which requires a wire to wire connection, if a wire to ground rod mold for the same wire size is available. By sealing the ground rod guide hole with the conversion plug, it is possible to connect two or more wires. This allows the end user to limit his inventory to a relatively few different weld mold designs and conversion plugs.

The conversion plugs of the present invention facilitate manufacturing by limiting the number of different weld mold designs that have to be made and minimizing the down time between production runs for different designs. Weld mold assemblies for conductor to conductor welded connections are typically manufactured for specific applications. Different designs are based on the number of ground rods and/or wires that are to be connected and the orientation of the guide holes. Since the conversion plugs of the present invention allow fewer weld mold designs to be used for multiple applications, production time is reduced and fewer machines can manufacture the same number of weld molds. This provides a savings in capital investment for equipment.

Figure 1:
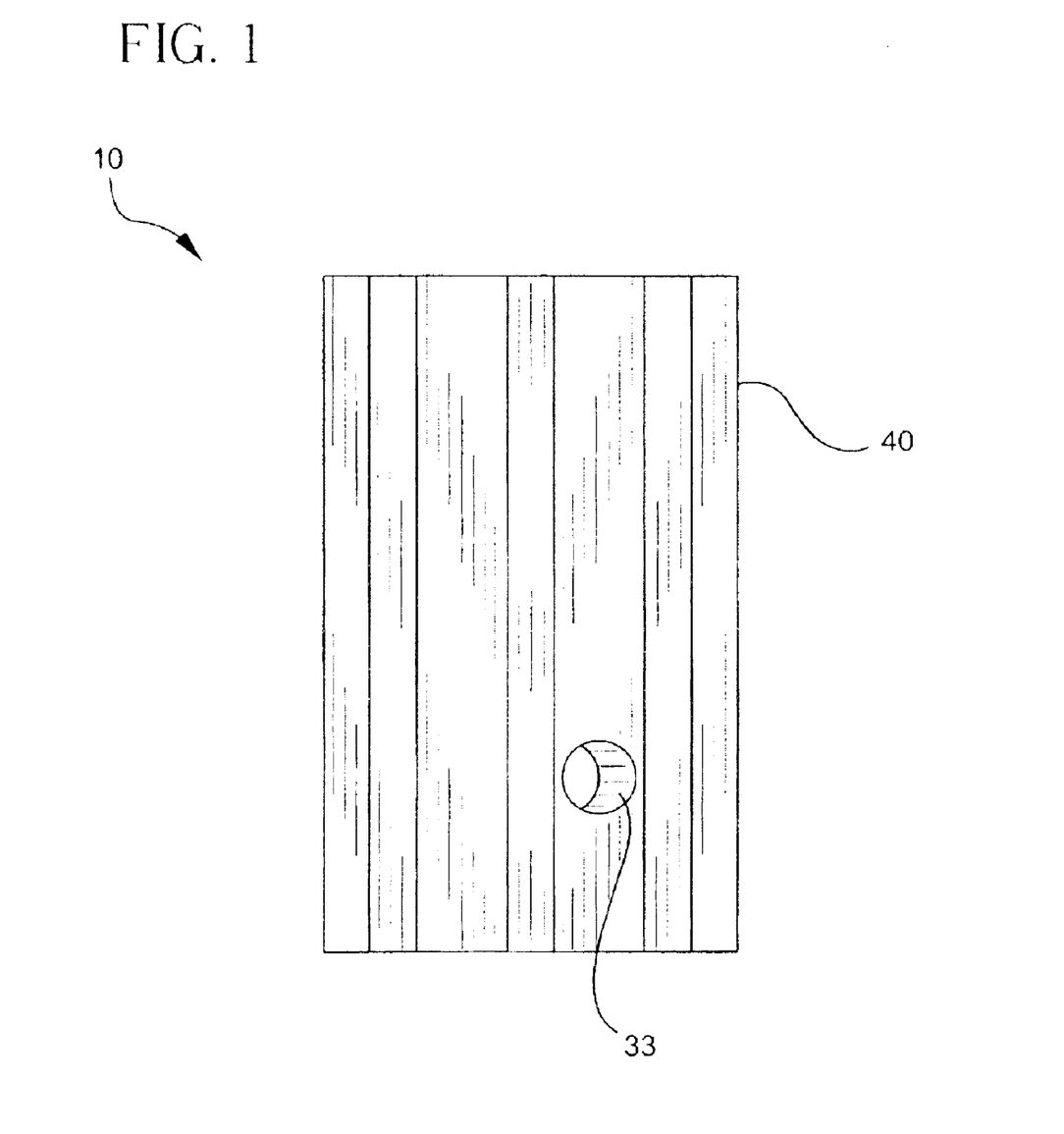
FIG. 1 is a side elevational view of an exothermic weld assembly.

FIG. 1 shows a side elevational view of an outer surface of the exothermic weld assembly of the preferred embodiment of the present invention. There is shown a weld assembly 10 having a vertical exterior flat surface 40 with a hole 33 drilled perpendicular into the flat surface 40, making the production of holes 33 more easy, accurate and efficient.

Figure 2:
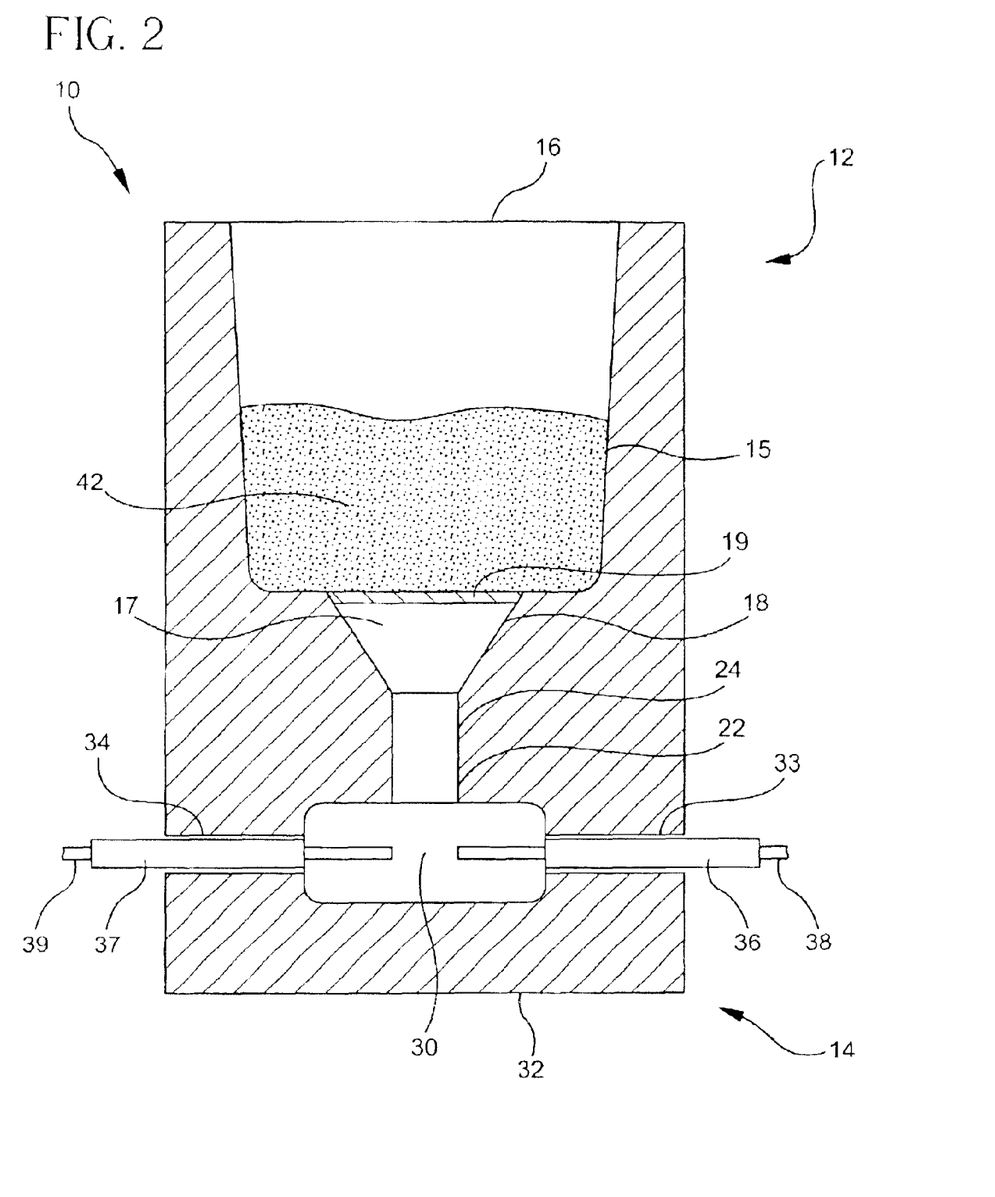
FIG. 2 is a cross-sectional view showing the interior sections of the exothermic weld assembly of FIG. 1 with conductors to be welded being disposed therein.

In FIG. 2, a cross-sectional view of the interior section of the exothermic weld assembly of the present invention is shown. In particular, FIG. 2 shows a disposable exothermic weld assembly 10 useful for forming welded connections between multiple conductors, such as between ground rods and wires. In the preferred embodiment, weld assembly 10 is a complete assembly, which includes everything that is required for an exothermic weld except for a flint igniter. Weld assembly 10 has two main sections: a crucible 12 on the top and a mold 14 located directly below the crucible 12 and communicating therewith.

The crucible 12 includes a generally u-shaped reaction chamber 15 with an open top 16. A lid (not shown) may be used to close the open top 16 of the reaction chamber 15. The reaction chamber 15 has a stopper 19 at the bottom. Crucible 12 also has a downwardly projecting nozzle 17 including a tapering shoulder 18 around the nozzle 17 which seats on a mold top 22. In this manner, the crucible 12 is supported by the mold 14 in its upright position as illustrated in FIG. 2.

Mold 14 in FIG. 2 is preferably a refractory frangible mold located below the crucible 12. Mold 14 includes multiple flat exterior surfaces with guide holes 33 and 34 drilled perpendicular into the flat exterior surface (not shown). Centrally located weld chamber 30 is in communication with the exterior of the mold 12 by guide holes 33 and 34, as shown in FIG. 2. Mold 14 also includes a mold top 22 directly above the weld chamber 30 and a mold bottom 32. In the preferred embodiment, holes 33 and 34 are outfitted with hollow guide sleeves 36 and 37 prior to insertion of the conductors. It is contemplated that guide sleeves are inserted onto the conductors prior to insertion into mold 12, or not used at all. Mold 12 may include multiple guide holes and hollow guide sleeves projecting outwards from weld chamber 30. The conductors 38, 39 that are being connected enter the mold assembly via guide sleeves 36 and 37 with the ends of the connectors projecting into weld chamber 30.

As shown in FIG. 2, nozzle 17 projects downwardly from the reaction chamber 15 into the mold top 22. Reaction chamber 15 is communicably connected to weld chamber 30 by the vertically extending tap hole 24. Reaction chamber 15 in crucible assembly 12 includes a suitable quantity of exothermic material 42, which is prevented from entering tap hole 24 by the stopper 19. Starting powder may be placed on top of the exothermic material. Desirably, a flint gun (not shown) is used to ignite the exothermic material 42. When ignited, the exothermic material 42 in reaction chamber 15 produces a reaction which forms molten metal. The stopper 19 is removed and molten metal flows through the tap hole 24 and into weld chamber 30 melting the conductor ends residing therein and forming a high ampacity, low resistance electrical connection between the conductors 38, 39.

After the weld is made, the weld assembly 10 may be left in place or broken away from the welded conductors 38, 39. Therefore, weld assembly 10 in FIG. 2 is designed to be disposable with the crucible permanently attached to the mold.

Figure 3:
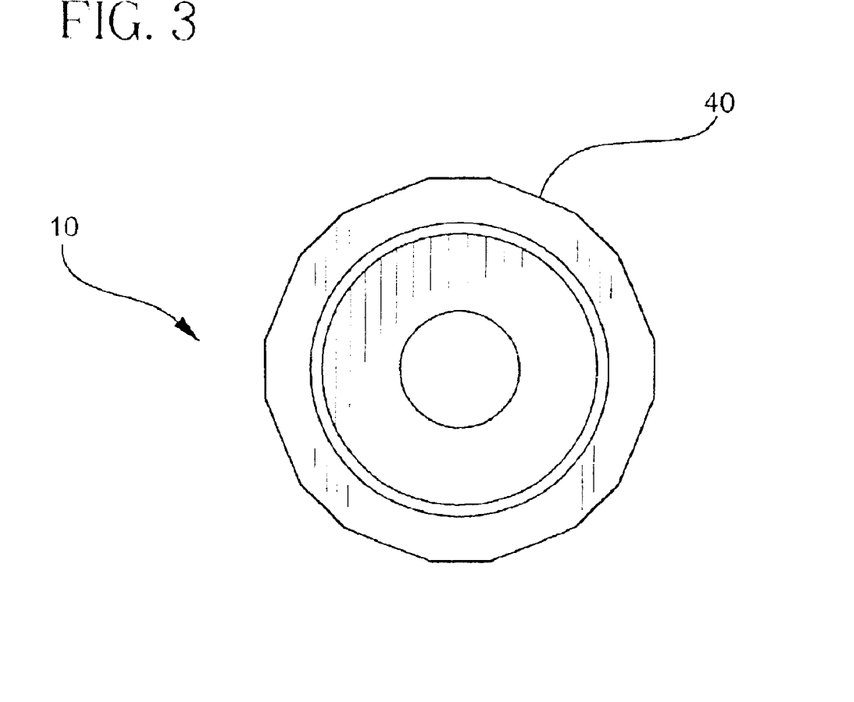
FIG. 3 is a top plan view of the exothermic weld assembly of FIG. 1.
Figure 4:
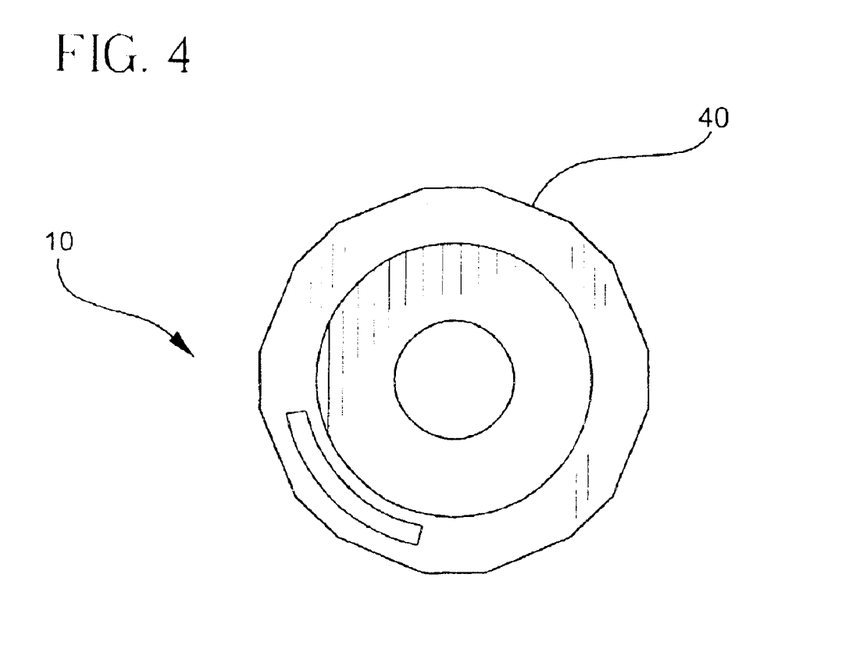
FIG. 4 is a bottom plan view of the exothermic weld assembly of FIG. 1.

As shown in FIGS. 3 and 4, the weld assembly 10 is formed and shaped so that there are multiple flat, vertical exterior surfaces 40. Desirably, there are at least two flat surfaces to accommodate two conductors. Drilling on a flat surface 40 is much easier than drilling on a curved surface. The mold of the present invention has multiple flat surfaces, which allow for easier and more efficient drilling of multiple holes in the weld assembly 10. Additionally, the weld assembly 10 of the present invention enables holes to be better and more accurately positioned. Moreover, reliable and efficient drilling of holes will ensure a secure insertion of the guide sleeves into the holes preventing any leakage of the molten metal from the hole. Useful shapes for the outer surface of the mold include triangular, square, heptagonal, hexagonal, octagonal and the like. In the preferred embodiment, weld assembly 10 is octagonal as shown in FIGS. 3 and 4.

Desirably, the inside diameter of the hollow guide sleeves is selected to be larger than the largest conductor or cable designed to be used with the mold. For example, a single type or size of mold may accommodate conductors having a wide range of sizes. The guide sleeves may be any suitable metal including but not limited to copper, aluminum or steel.

Figure 5:
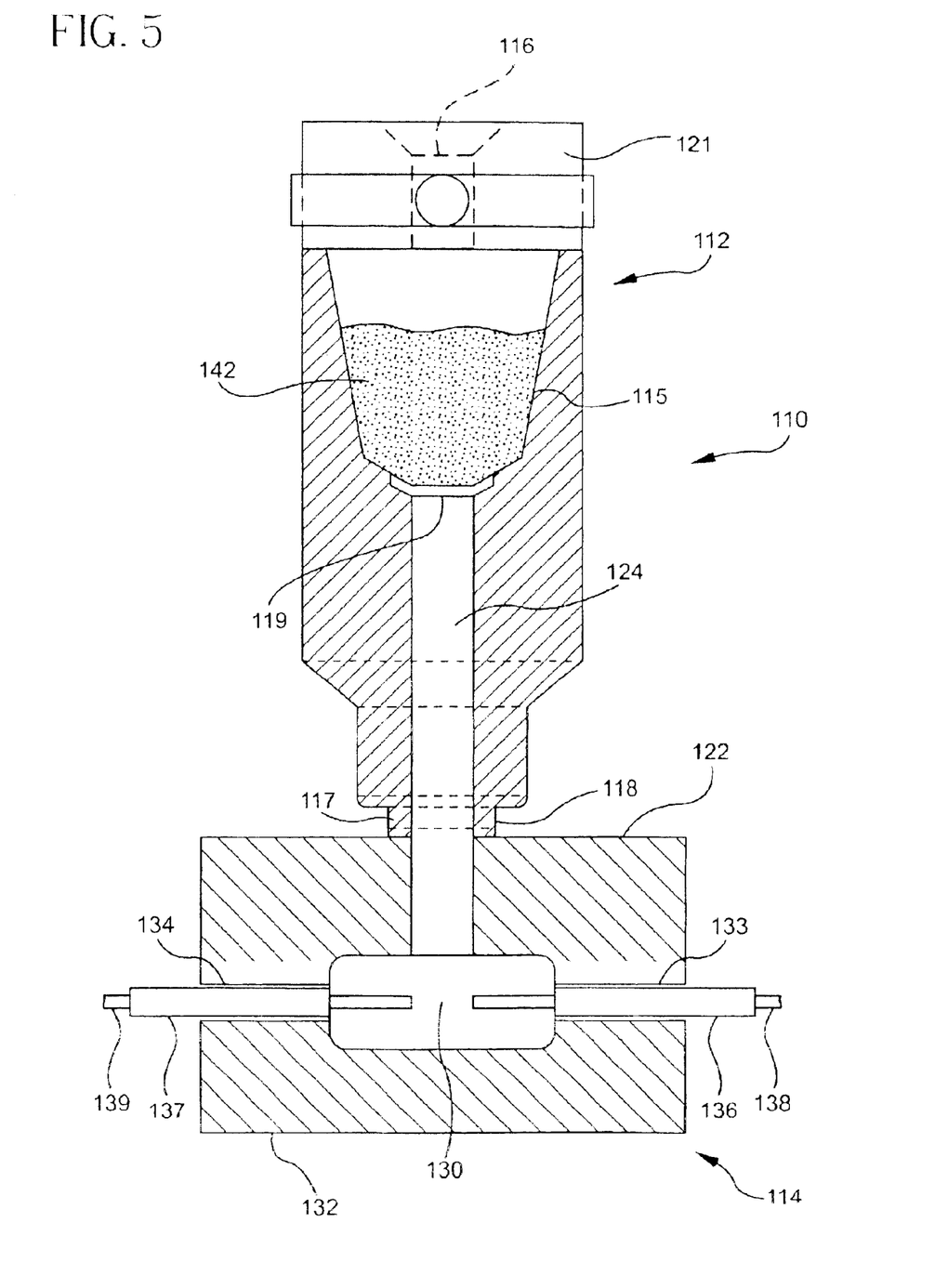
FIG. 5 is a cross-sectional view of an exothermic weld mold.

The invention has been shown and described with respect to certain preferred embodiments, however, other various embodiments of the present invention are contemplated. For instance, the present invention contemplates that a single use, disposable mold may be utilized with a reusable crucible. FIG. 5 shows such an embodiment of an exothermic weld assembly 110, wherein a mold 114 with multiple flat surfaces is connected to a reusable crucible 112. Crucible 112 includes open crucible top 116, and preferably a crucible cover 121. The crucible 112 also includes a generally u-shaped reaction chamber 115 having a suitable quantity of exothermic material 142. Furthermore, the crucible 112 has an exothermic material stopper or nozzle 117 which prevents the material from entering the tap hole 124.

Mold 114 in FIG. 5 is in communication with reusable crucible 112 by tap hole 124. Nozzle 117 has shoulders 118 leading to mold top 122. In this embodiment, mold 114 is a disposable, single use, refractory, frangible mold which is vertically split and preferably forms a weld chamber 130 with openings to the sides and top of the mold 114. Mold 114 also includes a mold top 122, a bottom 132, and guide holes 133, 134 drilled perpendicular to the flat exterior surface. The guide holes 133, 134 are outfitted with guide sleeves 136, 137 projecting outwardly from each side of the weld chamber 130. Conductors 138, 139 are inserted into the guide sleeves 136, 137 with the ends of the conductors 138, 139 projecting into the weld chamber 130 from each side.

After the weld is made, the crucible 112 is removed, cleaned and recharged for future use. At this point, the mold may be left in place or it may be broken away. Therefore, in the exothermic weld assembly 110 shown in FIG. 5, both the crucible 112 and mold 114 are designed as two individual units, which are temporarily attached, and the crucible 112 may be reused while mold 114 is disposed after use.

The disposable weld assembly 10 shown in FIG. 2 and the mold section 114 shown in FIG. 5 are preferably made of a frangible refractory material, not intended to be used again. The frangible refractory body may be formed of a variety of materials including fired clays, sand molds, bonded calcined dolomite, graphite molds, glass and the like. Desirably, the exothermic weld assembly includes graphite or ceramic materials. Sand molds may be formed in a variety of ways, such as foundry mold or core processes. These may include a variety of binder systems and include no-bake, heat cured, and cold box binder systems. In the no-bake and cold box processes, the binder is cured at room temperature. Some temperature sensitive materials, which indicate proper welding conditions, may be used.

Figure 6:
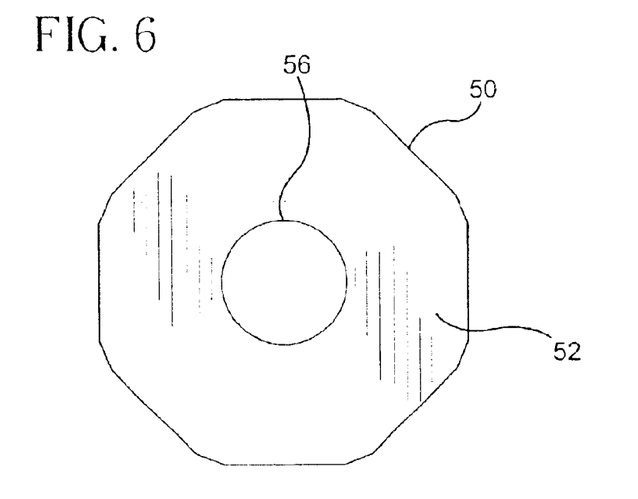
FIG. 6 is a plan view of a conversion plug of the present invention which includes a base portion.
Figure 7:
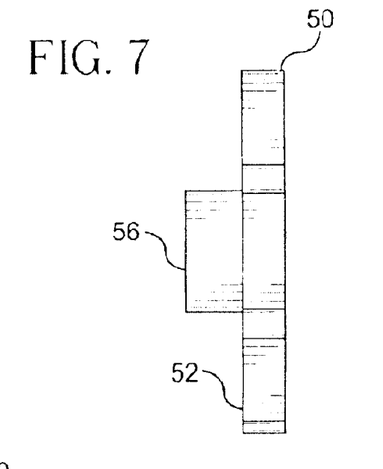
FIG. 7 is a side view of a conversion plug of the present invention which includes a base portion.
Figure 8:
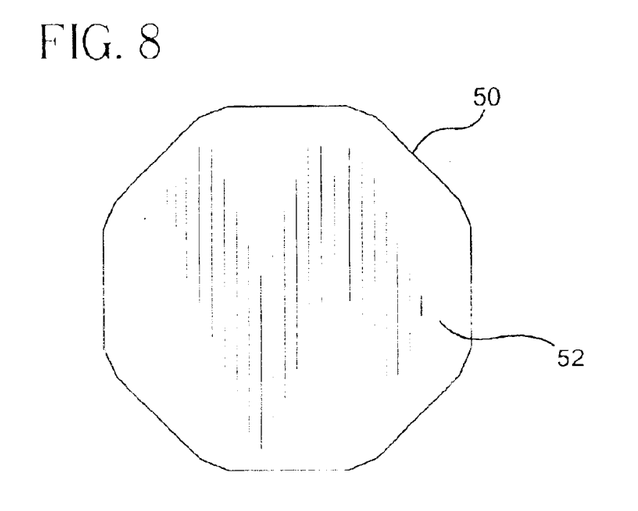
FIG. 8 is a plan view of the base of a conversion plug of the present invention.
Figure 12:
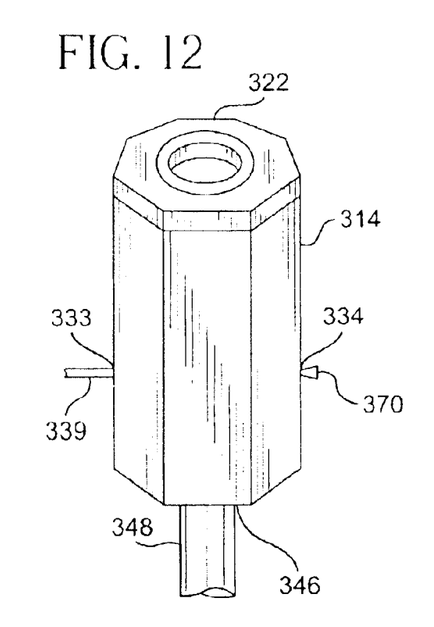
FIG. 12 shows a weld mold assembly with guide holes for connecting a ground rod and a wire and one guide hole that is sealed with a conversion plug.
Figure 13:
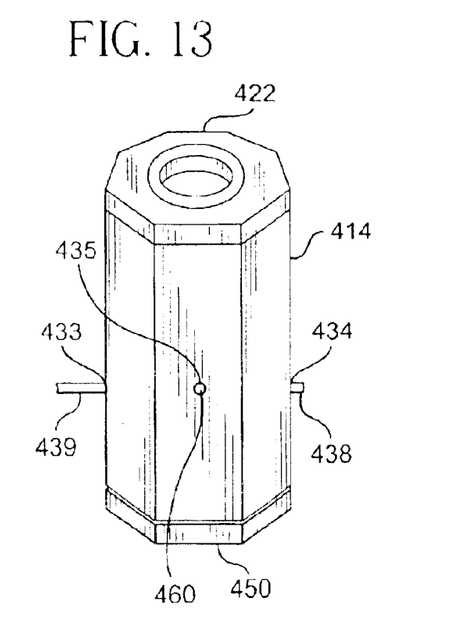
FIG. 13 shows a weld mold assembly with guide holes for connecting two wires and two guide holes that are sealed with conversion plugs.

FIGS. 6, 7 and 8 show a preferred embodiment of the conversion plug 50 of the present invention which is inserted in the ground rod guide hole of a welding mold. (FIG. 13 shows a conversion plug 450 inserted into the ground rod guide hole of welding mold 414.) The conversion plug 50 includes a base 52 and a plug portion 56 which is inserted into the ground rod guide hole. (The location of a ground rod guide hole 346 on a molding weld 314 is shown in FIG. 12.) FIG. 7 shows a cylindrical plug 50, but frustoconical plugs may also be used. The conversion plug 50 seals the ground rod guide hole so that the molten metal in the weld chamber is contained therein. When the weld mold is oriented so that the conversion plug 50 is facing downwardly, a retaining means, such as a clip or a clamp, is provided to retain the conversion plug 50.

Figure 9:
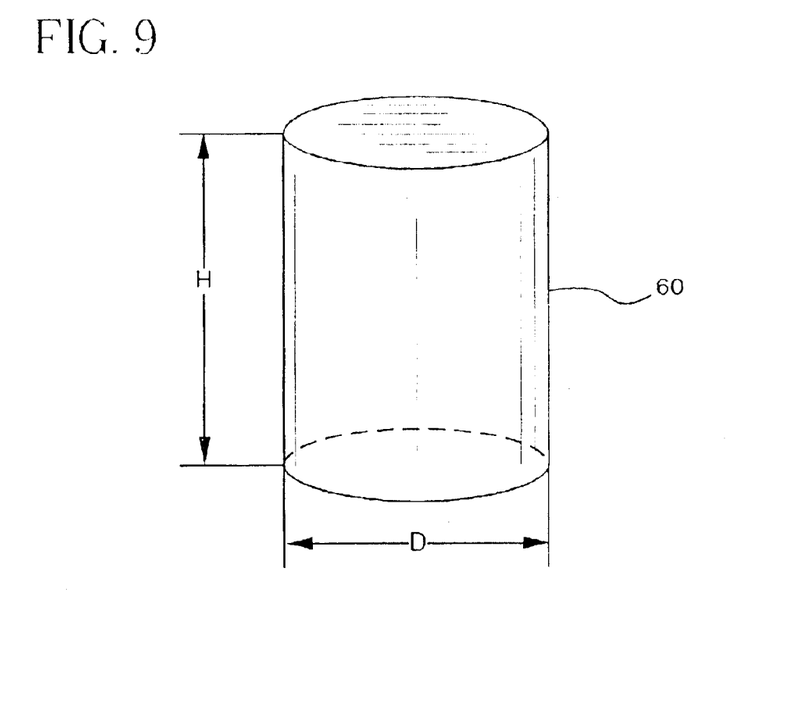
FIG. 9 is a side view of a cylindrical conversion plug of the present invention.

FIG. 9 illustrates another embodiment of a conversion plug 60 which can be used to seal either a ground rod guide hole or a wire guide hole. The height and diameter of the conversion plug 60 are selected according to the dimensions of the guide holes so that the conversion plug 60 can be sealably inserted therein. The compact size of the conversion plug allows it to be inserted into a guide hole from the outside of the weld mold or from inside the weld chamber. When the conversion plug 60 is inserted in a guide hole, the weld metal cannot escape from the weld chamber via the guide hole.

Figure 10:
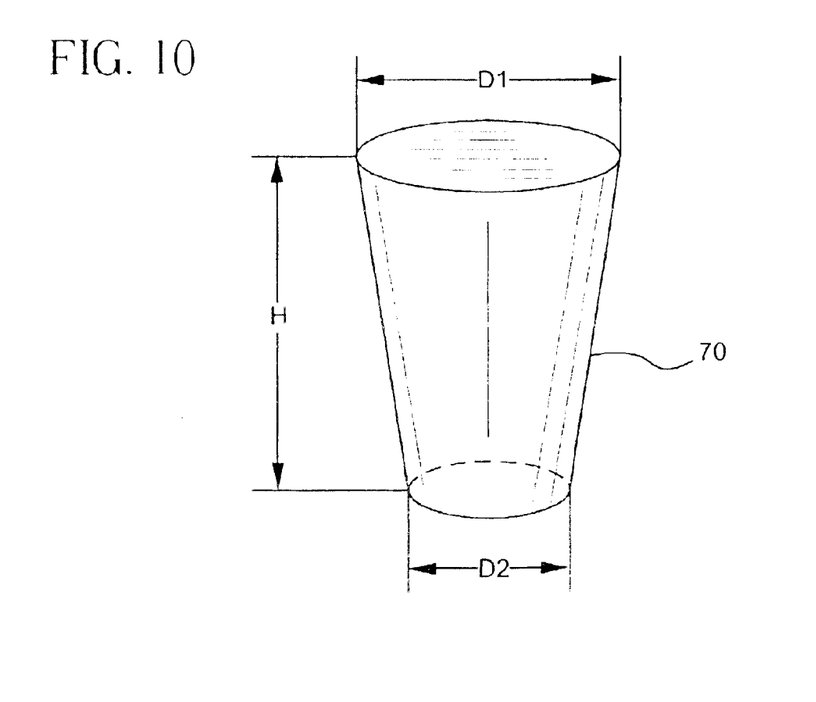
FIG. 10 is a side view of a tapered conversion plug of the present invention.

In FIG. 10, a tapered conversion plug 70 is shown having a generally frustoconical shape with one end 72 having a first diameter $D_1$ and an opposing end 74 having a second diameter $D_2$ which is less than the first diameter $D_1$. The frustoconical shape of the conversion plug 70 allows it to be securely inserted in a guide hole. Since the diameter of the guide holes can vary according to the gauge of the wire that is being connected, the frustoconical conversion plug 70 allows a single conversion plug 70 to be used to seal different size guide holes.

Figure 11:
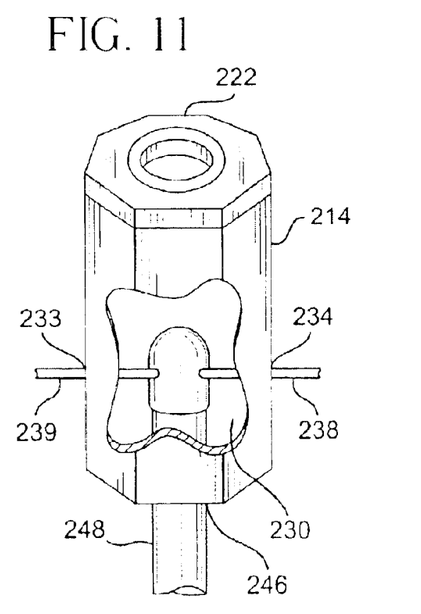
FIG. 11 shows a weld mold assembly with guide holes for connecting a ground rod and two wires.

FIG. 11 shows a weld mold 214 with a guide hole 246 in the bottom for insertion of a ground rod 248 and wire guide holes 233, 234 on opposing sides for insertion of wires 238, 239. The ground rod 248 and wires 238, 239 are connected in the weld chamber 230. The weld metal enters the weld mold 214 through the mold top 222.

In some applications, all of the guide holes in a weld mold are not needed. FIGS. 12 and 13 illustrate applications where conversion plugs of the present invention are used to seal wire that are not being used. FIG. 12 shows a weld mold 314 having a ground rod guide hole 346, two wire guide holes 333, 334 and a mold top 322. A ground rod 348 is connected to a wire 339 inside the weld mold 314 and a tapered conversion plug 370 is inserted in unused wire guide hole 334. This allows a welded connection to be made in the weld chamber between a ground rod 348 and a wire 339. The tapered conversion plug 370 seals wire guide hole 334 to convert a weld chamber 314 with three guide holes to a weld chamber 314 with two guide holes.

FIG. 13 shows a weld mold 414 having three wire guide holes 433, 434, 435 and a ground rod guide hole and a mold top 422. For this application, a conversion plug 450 is inserted in the ground rod guide hole and a cylindrical conversion plug 460 is inserted in a wire guide hole 435. The conversion plugs 450, 460 seal the two unused guide holes and convert the weld mold 414 so that it can be used to connect two wires 438, 439.

The size of the guide holes determines the size of the conversion plugs that are used. The conversion plugs must have dimensions that correspond to the size of the guide holes so that when they are inserted in the guide holes they seal the holes and prevent the weld material from escaping from the weld chamber.

The exothermic weld material is typically a mixture of reactants including a reducing agent, a metallic compound which is exothermically reduced by the reducing agent, and a filler metal that does not react with the metallic compound as disclosed in U.S. Pat. No. 5,062,903 issued to Bronan et al. and incorporated herein by reference. The exothermic reaction of the weld material produces a molten weld metal, a metal oxide slag formed from the reducing agent and the metallic compound and evolving gases.

The reducing agent can be aluminum, magnesium, zirconium and equivalent metals which exhibit compounds that have a high thermodynamic heat of formation with respect to the reaction product between the metal and the metallic compound to be reduced.

The metallic compound can be magnesium sulfate ($MgSO_4$), calcium sulfate ($CaSO_4$), and barium sulfate ($BaSO_4$), fluoride compounds, and equivalent materials which upon reduction contribute one or more elements to exothermically form a compound with the reducing agent. Desirably, the metallic compound is utilized in an anhydrous form and all of the reactants are protected from moisture prior to use. Moisture contamination may retard or suppress the exothermic reaction.

The filler metal can be any metal suitable for use in a welding process. Aluminum and copper are widely used in electric transmission applications and, therefore, are preferred as filler metals in applications which require welding aluminum or copper articles.

The mixture of reactants may additionally include a flux to lower the melting point of the mixture and products. Commonly utilized fluxes include calcium fluoride ($CaF_2$), magnesium fluoride ($MgF_2$), cryolite ($Na_3AlF_6$), and other substances such as alkali compounds, particularly alkali silicates and fluorosilicates. Fluxes may be used to lower the fusion point and increase the fluidity of the reaction products (i.e., "slag") such that the molten filler metal can readily be separated from the slag and flow into the mold cavity.

While the invention has been described by the foregoing detailed description in relation to the preferred embodiments with several examples, it will be understood by those skilled in the art that various changes may be made without deviating from the spirit and scope of the invention as defined in the appended claims.

We claim:

1. A weld mold assembly comprising:
    a crucible section for exothermically reacting weld material to form a molten metal;
    a weld mold including a weld chamber having an opening for receiving said molten metal and being in communication with said crucible section, said weld mold including a plurality of guide holes for receiving ground rods and wires; and
    a conversion plug sealably inserted into at least one of said guide holes.

2. The weld mold assembly of claim 1, wherein said weld mold further comprises a plurality of flat exterior surfaces.

3. The weld mold assembly of claim 1, wherein said conversion plug is tapered.

4. The weld mold assembly of claim 1, wherein said conversion plug is cylindrical.

5. The weld mold assembly of claim 1, wherein said weld mold comprises a guide hole for receiving a ground rod and a plurality of guide holes for receiving wires.

6. The weld mold assembly of claim 1, wherein said conversion plug is fabricated from a ceramic, graphite or a refractory frangible material.

7. The weld mold assembly of claim 3, wherein said conversion plug is inserted into said guide hole from said weld chamber end or from said exterior end.

8. The weld mold assembly of claim 7, further comprising a wire or sheet metal clip for holding said conversion plug in place.

9. The weld mold assembly of claim 1, wherein said weld mold assembly is disposable or reusable.

10. The weld mold assembly of claim 1, wherein said crucible section comprises a tap hole.

11. A weld mold assembly comprising:
    a crucible section for exothermically reacting weld material to form a molten metal, said crucible section having a tap hole;
    a weld mold comprising a weld chamber having an opening for receiving said molten metal and a plurality of guide holes extending from said weld chamber to the exterior of said weld mold for receiving ground rods and wires;
    a nozzle for separably connecting said crucible section and said weld chamber, and placing said tap hole and said weld chamber opening in communication; and
    a conversion plug sealably inserted into at least one of said guide holes.

12. The weld mold assembly of claim 11, wherein said weld mold further comprises a plurality of flat exterior surfaces.

13. The weld mold assembly of claim 11, wherein said conversion plug is tapered.

14. The weld mold assembly of claim 11, wherein said conversion plug is cylindrical.

15. The weld mold assembly of claim 13, wherein said conversion plug is inserted into said guide hole from said weld chamber end or from said exterior end.

16. The weld mold assembly of claim 15, further comprising a wire or sheet metal clip for holding said conversion plug in place.

17. The weld mold assembly of claim 11, wherein said weld mold is reusable or disposable.

18. The weld mold assembly of claim 11, wherein said conversion plug is fabricated from a ceramic, graphite or a refractory frangible material.

19. The weld mold assembly of claim 11, wherein said weld mold is fabricated from a ceramic, graphite or a refractory frangible material.

\* \* \* \* \*